United States Patent [19]

Wong

[11] Patent Number: 4,938,125
[45] Date of Patent: Jul. 3, 1990

[54] LIQUID DISPENSING APPARATUS

[76] Inventor: Don M. Wong, 2296 Bunker Hill Dr., San Mateo, Calif. 94402

[21] Appl. No.: 114,472

[22] Filed: Oct. 28, 1982

[51] Int. Cl.$^5$ .......................... A47J 27/14; A47J 27/66
[52] U.S. Cl. ......................................... 99/326; 99/348; 99/330; 99/407; 222/168.5
[58] Field of Search .................. 99/326, 330, 407, 352, 99/334, 348; 141/284; 222/168, 168.5, 505, 160, 162, 167, 169

[56] References Cited

U.S. PATENT DOCUMENTS

| | | | |
|---|---|---|---|
| 1,934,445 | 11/1933 | Poplawski | 222/160 |
| 1,940,071 | 12/1933 | Brand | 99/440 X |
| 2,618,219 | 11/1952 | Hummel | 99/330 |
| 3,305,139 | 2/1967 | Ward | 222/168.5 |
| 3,374,811 | 3/1968 | Goosman | 222/168.5 |
| 3,426,944 | 2/1969 | French | 222/167 |
| 4,503,502 | 3/1985 | Chapin | 99/348 X |
| 4,649,810 | 3/1987 | Wong | 99/326 |

Primary Examiner—Stephen Marcus
Assistant Examiner—Christine A. Peterson
Attorney, Agent, or Firm—Townsend and Townsend

[57] ABSTRACT

A dispenser for liquids or granular materials suitable for use in an automatic cooking apparatus. Liquid ingredients are held in a container with a dispensing orifice in the bottom. The orifice is sealed by a valve at the underside of the container, which is mounted on an actuator member pivotally mounted to the underside of the container.

The actuator member holds the valve seal over the orifice. The cooking apparatus rotates the container into position for dispensing, and as it approaches the dispensing position, a camming pin engages the actuator member causing it to rotate the valve seal away from the orifice. As a result, the contents of the container are dispensed.

5 Claims, 4 Drawing Sheets

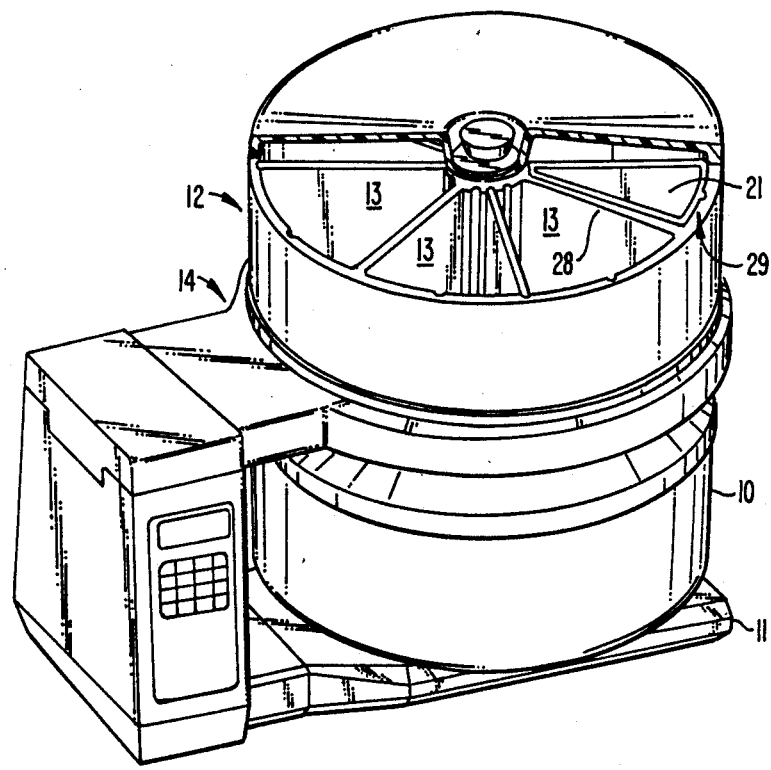
FIG._1.

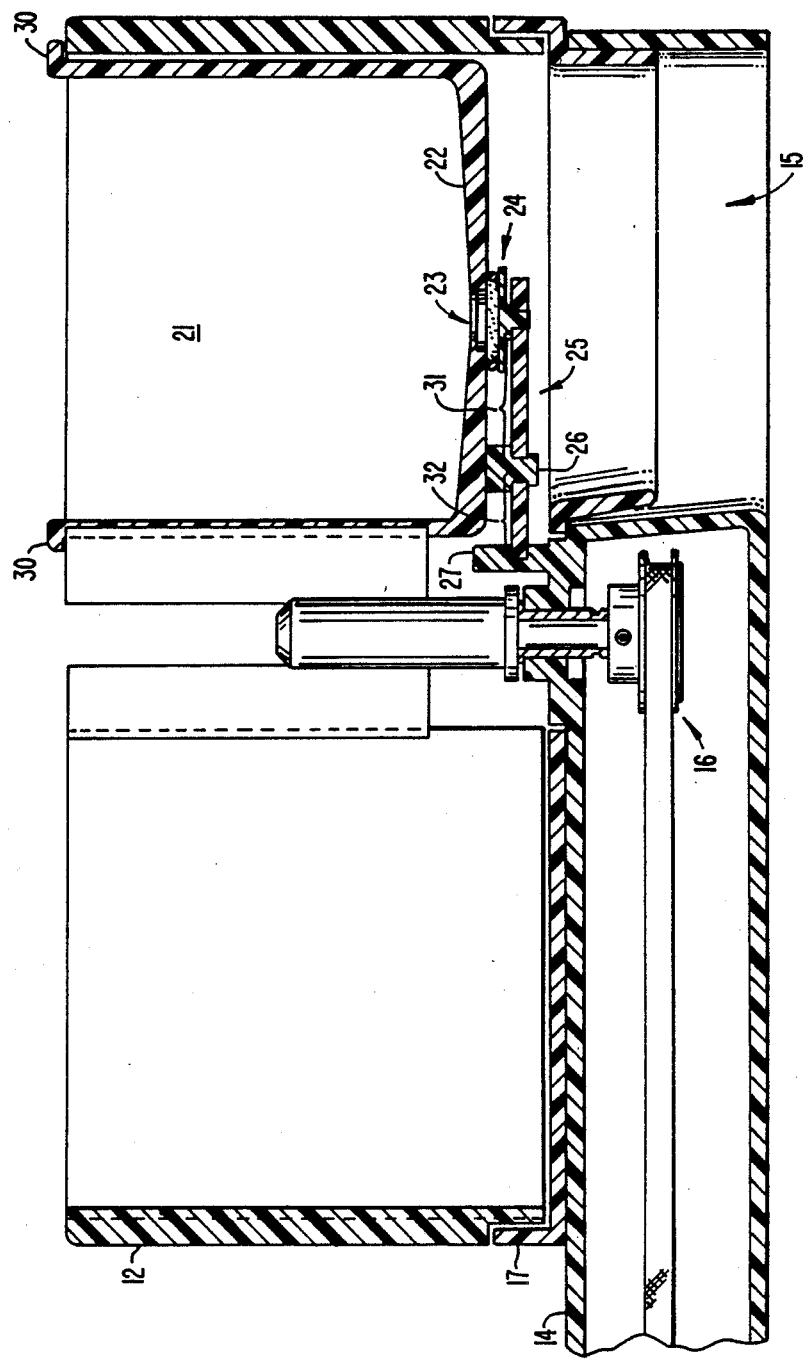

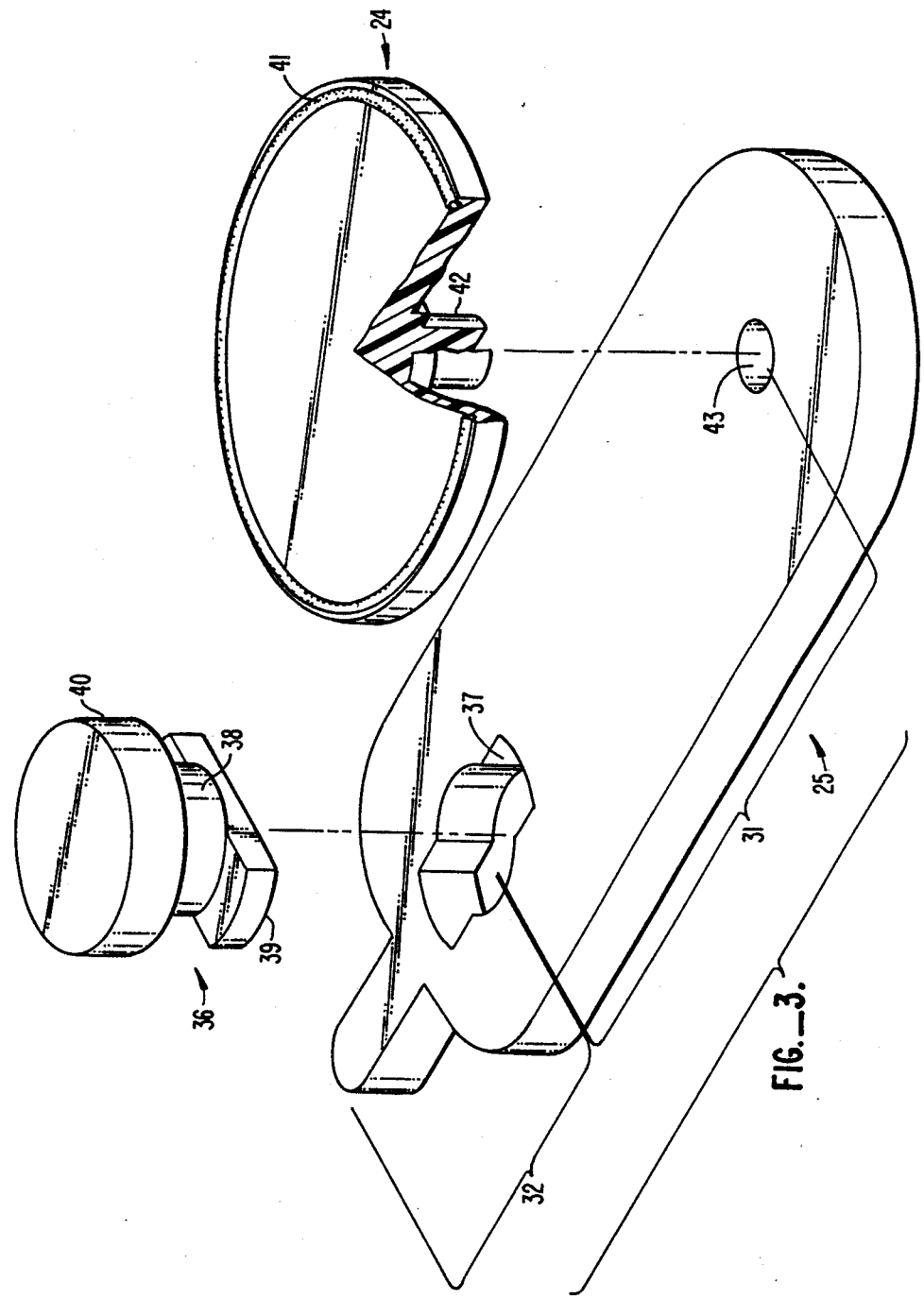
FIG._3.

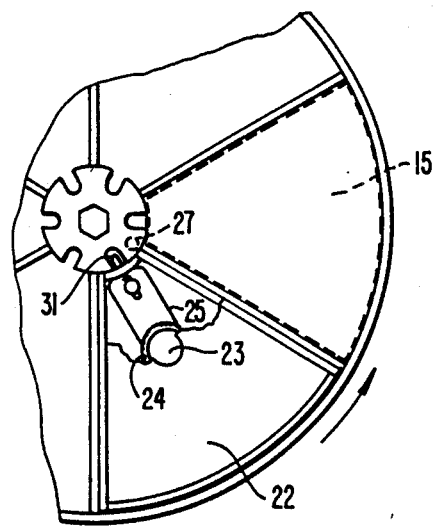
FIG._4A.
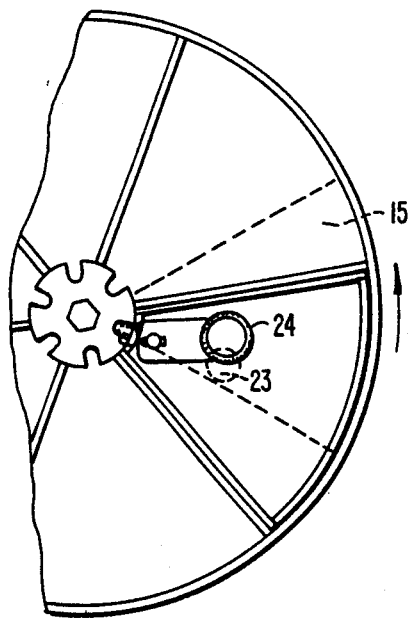
FIG._4C.
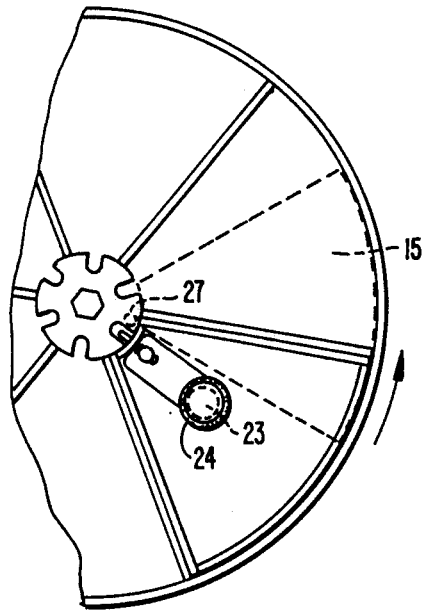
FIG._4B.
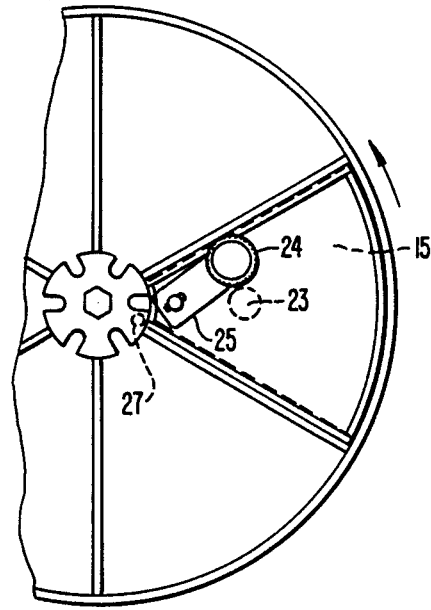
FIG._4D.

LIQUID DISPENSING APPARATUS

BACKGROUND OF THE INVENTION

1. Field of the Invention:

The present invention relates to automatic cooking apparatus, and more specifically to a system for dispensing liquids in such apparatus.

2. Background of the Invention:

U.S. Pat. No. 4,649,810 entitled "Automatic Cooking Apparatus" discloses a cooking apparatus, in which ingredients are automatically dispensed into a cooking vessel and heated, stirred, covered, and uncovered according to a prescribed recipe. In one embodiment of that invention, the ingredients are preloaded into a compartmentalized carousel which rotates on command under the control of a microprocessor to bring the appropriate compartment into position for dispensing its ingredients into the vessel. Since recipes often call for the addition of liquids, including liquids with suspension of small particles and granular materials, to be truly automatic the cooking apparatus must include a mechanism for automatically dispensing such ingredients.

Liquid ingredients present a problem not shared by chopped onions, cubed beef, or other solid ingredients—liquids tend to leak through even the smallest opening. Compartments or chambers intended to hold liquid ingredients must be sealed against such leakage and in the past have generally required complicated mechanisms to break the seal at the right time for dispensing the ingredients into the cooking vessel. The liquid-dispensing apparatus disclosed in U.S. Pat. No. 4,649,810, for example, employs an elastomeric stopper, which is urged by a spring-biasing mechanism into a sealing position in a dispensing orifice so as to maintain a good seal, and which is opened by a cam mechanism involving two rotatable cams. In this arrangement a portion of the mechanism is disposed inside the chamber and is immersed in the liquid to be dispensed. This arrangement diminishes the volume available for the liquid and makes cleaning more difficult.

The design of an automatic liquid dispensing system, suitable for use in cooking apparatus intended for the domestic kitchen, involves a tradeoff of such factors as reliability—will it always work without leaking: durability—will it withstand the normal abuse encountered in the domestic kitchen and continue to work; compactness—does it make the cooking apparatus unappealingly bulky or unwieldy manufacturing cost—does it make the cooking apparatus too expensive for typical households: and especially cleanliness—can the mechanism be cleaned easily and thoroughly.

SUMMARY OF THE INVENTION

The present invention provides a particularly simple and compact mechanism for dispensing liquid or granular ingredients or the like in an automatic cooking apparatus, which, despite its simplicity, successfully meets the above tradeoff.

Briefly, the invention includes a chamber for holding the liquid ingredients, which has an orifice in its bottom wall through which the ingredients are dispensed. The mechanism for closing and opening the dispensing orifice is mounted underneath the bottom wall of the chamber. It includes an actuator member which is pivotally mounted to the underside of the chamber's bottom wall at a position offset from the orifice and which is formed with two extending portions or arms. The first portion extends from the pivot to the vicinity of the orifice and provides a support arm or member, to which is connected a closure member for sealing the orifice. The second portion extends away from the pivot mounting and provides a lever arm for use in pivoting the actuator member and moving the closure member out of its sealing position at the orifice. A camming member is positioned so as to engage the lever arm and urge the closure member out of its sealing position at the proper moment for dispensing the ingredients.

The liquid holding chamber is itself disposed within a dispensing structure, which is operable to bring the liquid holding chamber into position for dispensing its ingredients. The camming member is mounted in stationary relation with respect to the movable dispensing structure. As the liquid holding chamber is moved into dispensing position, the moving lever arm engages the stationary cam, thereby causing the actuator member to pivot and displace the closure member from the orifice.

A feature of this arrangement is that the mechanism for sealing and unsealing the orifice may be located beneath and not in the liquid container. This facilitates cleaning of the various components and does not waste the space within the container. In one embodiment the mechanism is removably mounted on the underside of the chamber to further facilitate cleaning. Moreover, the mechanism is especially compact and has few moving parts, providing for greater durability.

Although the invention is particularly suited for use with the automatic cooking apparatus disclosed in U.S. Pat. No. 4,649,810, it may be beneficially applied in other environments as well.

Other aspects, advantages and novel features of the invention are described herein below or will be readily apparent to those skilled in the art from the following specifications and drawings of an illustrative embodiment.

BRIEF DESCRIPTION OF THE DRAWINGS

FIG. 1 is a perspective view of cooking apparatus of the type employing the present invention.

FIG. 2 is a cross-sectional view of a dispensing structure showing a liquid-dispensing apparatus according to the invention.

FIG. 3 is an exploded perspective view of a mechanism for unsealing a liquid holding chamber according to the invention.

FIGS. 4A–D comprise a cartoon sequence showing the operation of the mechanism of FIG. 3.

DETAILED DESCRIPTION OF PREFERRED EMBODIMENTS

A specific embodiment of the present invention is described herein with reference to a cooking apparatus of the type disclosed in U.S. Pat. No. 4,649,810 and illustrated in FIG. 1. The cooking apparatus includes a cooking vessel 10 resting on a heating element 11 and a compartmentalized dispensing structure 12 in the form of a carousel with a plurality of chambers 13 for holding the culinary ingredients called for by a prescribed recipe.

The carousel 12 is mounted on a supporting housing 14, which includes an aperture 15 through which the ingredients held by the carousel are dispensed into the cooking vessel 10. (See the cross-sectional view of FIG. 2.) The carousel 12 is caused to rotate, such as by the belt and pulley arrangement 16 of FIG. 2, so as to bring each of the chambers 13 into a dispensing position over the aperture 15. For solid ingredients the chambers of the carousel 12 may be formed with no bottom wall, which is provided instead by a separate platform 17 mounted on the housing 14 and having an aperture corresponding to the aperture 15 through which the ingredients can fall into the cooking vessel 10 below. As the carousel 12 rotates, solid ingredients in a given chamber 13 will be swept over the aperture 15 by a side wall of the chamber and will tumble into the cooking vessel 10. This form of chamber and manner of dispensing ingredients is unsuitable for liquid ingredients.

The present invention provides a liquid holding chamber 21 which, unlike the chambers 13 for solid ingredients illustrated in FIG. 1, is formed with a bottom wall 22 having an orifice 23 through which the liquid can drain. The mechanism for closing and opening the orifice is disposed on the underside of the bottom wall 22 and comprises a closure member 24 mounted on an actuator member 25, which in turn is pivotally mounted to the underside of bottom wall 22 by pivot mounting 26. The actuator member is engaged or "tripped" by a camming member 27, as will be described more fully below.

As illustrated in FIG. 1, the liquid holding chamber 21 is disposed within the dispensing carousel so as to be carried by the movement of the carousel into position over the dispensing aperture 15. The chamber 21 may be formed as a unit removable from the carousel 12 for cleaning. In the embodiment of FIG. 1, the chamber 21 is generally sector-shaped although it may form other shapes as well. The chamber 21 may be secured in the carousel 12 by partitions such as the partition 28, or it may be keyed to the carousel wall such as shown at 29 in FIG. 1, and may be held in its vertical disposition by lip 30. Other methods of mounting the chamber to the dispensing carousel will readily occur to those skilled in the art. The interior surface of the bottom wall 22 may be sloped to facilitate drainage such as illustrated in FIG. 2.

The actuator member 25 is shaped so as to provide a first portion 31, extending from the pivotal mounting, which serves as a support arm for the closure member 24. The actuator member 25 has a second portion 32, which extends from the pivot mounting in a generally opposite direction from the first portion 31, and which serves as a lever arm for actuating the opening of the orifice 23.

A pivot mounting 26 for pivotally and removably mounting the actuator member 25 to the bottom wall 22 is shown in FIG. 3. The pivot means 26 includes a T-shaped support assembly 36 connected to the bottom wall 22 which cooperates with a circularized slot 37 formed in the actuator member 25. The assembly 36 includes a generally cylindrical post 38, an elongate member 39 permanently affixed to the distal end of the post 38 and providing the cross member of the T-shaped assembly, and a spacer member 40 at the proximal end of the post 38. The spacer member has a diameter greater than that of the post 38 and is secured to the bottom wall 22 of the liquid holding chamber. The dimensions of circularized slot 37 correspond to the dimensions of the cylindrical post 38 and cross member 39, such that the slot 37 will receive the support assembly 36. Actuator member 25 is mounted on the bottom wall 22 by pushing the slot 37 over support assembly 36 and rotating the actuator member through an angle of 90 degrees. The spacer member 40 serves to offset the actuator member 25 from the bottom wall 22 a sufficient distance to accommodate the closure member 24 and provide a snug fit against the orifice 23.

The closure member 24 is removably mounted at the radially outwardly end of the actuator member 25 and is sufficiently large to cover and seal the orifice 23. The closure member 24 may include a rubber or elastomer 0-ring or washer 41 to ensure sealing of orifice 23. Alternatively, the bottom wall 22 may be formed with an indentation surrounding the orifice 23 for receiving an O-ring. In the example of FIG. 3, the closure member 24 includes a generally cylindrical post 42 on its non-sealing side which is received in a mating hole 43 in the first portion 31 of the actuator member.

To assure good closure of the closure member 24 in its sealing position on the orifice 23, the O-ring should be chosen of sufficient height to be slightly deformed when installed. In addition, the actuator member 25 may be biased so as to exert an upward force on the closure member toward the bottom wall 22. The biasing action of the actuator member forces the closure member and O-ring tightly into contact with the bottom wall to seal the orifice 23 more effectively against liquid leakage. The bias may be achieved, for example, by pre-stressing the actuator member so as to provide a leaf spring action. Methods for forming pre-stressed members are well known and will not be described herein.

The lever arm 32 of the actuator member is actuated by camming pin 27. The pin 27 is disposed in stationary relation to the rotating carousel 12. As shown in FIG. 2, the camming pin 27 is positioned on the stationary platform 17 by the inner hub supporting the carousel. Although illustrated as a simple pin in FIG. 2, the camming member may also be provided a roller or other convenient camming mechanisms.

FIGS. 4A–D provide a cartoon sequence illustrating the manner in which the ingredients of container 21 are dispensed into the cooking vessel 10. In the sequence, carousel 12 and container 21 are viewed from the top as they rotate counterclockwise. The dispensing aperture 15 is shaded in the figures for purposes of clarity. In the Figures, O-ring 41 is mounted on the bottom wall 22 of the container 21, as opposed to being mounted directly on the closure member 26.

In FIG. 4A the orifice 23 is sealed by the closure member 24. Stationary camming pin 27 (shown in phantom) is not in contact with the lever arm 31. In FIG. 4B. container 21 has begun to rotate over the dispensing aperture 15 and pin 27 begins to contact the lever arm 31 while the orifice 23 remains sealed. In FIG. 4C the orifice 23 is positioned over the dispensing aperture 15. At this degree of rotation, the actuator member 25 is caused to pivot about post 38 by the camming pin 27 acting on the lever arm. As a result, the closure member 24 slides off of the orifice 23, allowing the liquid or granular contents of the container to begin to pour through the orifice 23, the aperture 15, and into the cooking vessel 10 below. In FIG. 4D, rotation of the actuator member 25 has completely displaced the closure member from the orifice 23.

In normal operation, carousel 12 moves sufficiently slowly, or alternatively is stopped for a sufficient time, to allow the contents of the container 21 to empty out through the orifice 23. After a suitable dwell time (if the carousel is stopped), the drive to the carousel 12 is reactivated if called for by the recipe. As carousel 12 and container 21 continue to rotate, the actuator member 25 remains in the disposition shown in FIG. 4D and the orifice 23 remains uncovered. Since the container 21 has already been emptied, it is of no consequence that the container remains unsealed for the remainder of the rotation of the carousel. When the carousel is to be used again for another recipe, the closure member is manually positioned over the orifice 23.

The length of the arc through which the closure member 24 travels as it is forced off of the orifice 23 may be adjusted by appropriate selection of the relative lengths of the lever arm 31 and support arm 32 and by appropriate positioning of the pivot mounting 26 and camming pin 27 with respect to the axis of rotation of the dispensing carousel. For example, in the specific embodiment illustrated in FIG. 2, the lever arm is roughly two centimeters in length, the support arm is roughly 3.1 centimeters in length, the orifice is roughly 0.9 centimeters in diameter, the O-ring outer diameter is roughly 2.2 centimeters, the contact point of the camming pin with the lever arm is displaced 1.7 centimeters from the carousel axis of rotation and the pivot mounting is displaced 3.5 centimeters from the carousel axis of rotation. These dimensions have been found to provide satisfactory dispensing of liquids from a generally sector-shaped chamber subtending 60° disposed within a carousel roughly 25.5 centimeters in diameter.

While the above provides a full and complete disclosure of the preferred embodiments of the invention, various modifications and equivalents will occur to those skilled in the art given the benefit of this disclosure. For example, those skilled in the art will recognize that the actuator member may be formed in various configurations to achieve the purpose of the invention. Similarly, various means to bias or pivot the actuator member and various O-ring configurations may be employed. In addition, the closure member need not be mounted on the actuator member as shown in the specific embodiment illustrated herein. It may alternatively be releasably secured to the underside of the liquid-dispensing chamber and held in its sealing position by engagement with the actuator member.

It is to be expressly understood that the invention is not intended to be limited only to the specific examples and embodiments disclosed herein, but is defined by the appended claims.

What is claimed is:

1. In a cooking apparatus for use in a domestic kitchen of the type including a cooking vessel and a dispensing structure defining a plurality of chambers for holding ingredients to be dispensed into the cooking vessel, the dispensing structure being mounted for rotation about a central axis of rotation so as to bring said chambers into position for dispensing their ingredients into said cooking vessel, apparatus for dispensing liquid ingredients or the like into said vessel comprising:
    a liquid holding chamber disposed within said dispensing structure and movable therewith into dispensing position, said liquid holding chamber having a bottom wall formed with a dispensing orifice therein;
    a liquid-dispensing actuator member pivotally mounted to the underside of said bottom wall to rotate about an actuator axis spaced from said orifice, said actuator member being formed with a first portion extending between said actuator axis and said orifice and a second portion extending away from and said first portion and toward the axis of rotation of said dispensing structure so as to form a lever arm for use in pivoting said actuator member about said actuator axis;
    a closure member formed for sealing said orifice and disposed so as to be movable into and out of a sealing position at said orifice for respectively containing and releasing liquid ingredients within said liquid holding chamber; and
    a camming member mounted proximate to said central axis of rotation in stationary relation with respect to said rotating dispensing structure and positioned to engage said lever arm as said dispensing structure rotates so as to urge said closure member out of said sealing position when said liquid holding chamber is in position for dispensing its liquid ingredients into said vessel.

2. In a cooking apparatus for use in a domestic kitchen of the type including a cooking vessel and a dispensing structure defining a plurality of chambers for holding ingredients to be dispensed into the cooking vessel, the dispensing structure being mounted for rotation about a central axis of rotation so as to bring said chambers into position for dispensing their ingredients into said cooking vessel, apparatus for dispensing liquid ingredients or the like into said vessel comprising:
    a liquid holding chamber disposed within said dispensing structure and movable therewith into dispensing position, said liquid holding chamber having a bottom wall formed with a dispensing orifice therein;
    a liquid-dispensing actuator member pivotally mounted to the underside of said bottom wall to rotate about an actuator axis spaced from said orifice, said actuator member being formed with a first portion extending between said actuator axis and said orifice and a second portion extending away from said axis and said first portion and toward the axis of rotation of said dispensing structure so as to form a lever arm for use in pivoting said actuator member about said actuator axis;
    a closure member, mounted on said actuator member first portion, formed for sealing said orifice and movable with said actuator member into and out of a sealing position at said orifice for respectively containing and releasing liquid ingredients within said liquid holding chamber; and
    a camming member mounted proximate to said central axis of rotation in stationary relation with respect to said rotating dispensing structure and positioned to engage said lever arm as said dispensing structure rotates so as to urge said closure member out of said sealing position when said liquid holding chamber is in position for dispensing its liquid ingredients into said vessel.

3. The apparatus of claim 2, wherein said actuator member is removably pivotally mounted to said bottom wall.

4. The apparatus of claim 2, wherein said actuator member is structured and arranged to bias said closure member against said underside in said sealing position.

5. The apparatus of claim 1, wherein said actuator member is structured and arranged to bias said closure member against said underside in said sealing position.

* * * * *